(12) United States Patent
Zatsman et al.

(10) Patent No.: US 8,572,075 B1
(45) Date of Patent: *Oct. 29, 2013

(54) FRAMEWORK FOR EVALUATING WEB SEARCH SCORING FUNCTIONS

(75) Inventors: Misha Zatsman, San Francisco, CA (US); Paul G. Haahr, San Francisco, CA (US); Matthew D. Cutts, Los Altos, CA (US); Yonghui Wu, Riverside, CA (US)

(73) Assignee: Google Inc., Mountain View, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/296,099

(22) Filed: Nov. 14, 2011

Related U.S. Application Data

(63) Continuation of application No. 12/508,023, filed on Jul. 23, 2009, now Pat. No. 8,060,497.

(51) Int. Cl.
*G06F 17/30* (2006.01)

(52) U.S. Cl.
USPC .......................................................... 707/723

(58) Field of Classification Search
USPC .......... 707/706, 722, 723, 735, 748, 752, 603
See application file for complete search history.

(56) References Cited

U.S. PATENT DOCUMENTS

| | | | |
|---|---|---|---|
| 7,003,513 B2 * | 2/2006 | Geiselhart | 1/1 |
| 7,243,102 B1 * | 7/2007 | Naam et al. | 1/1 |
| 7,251,654 B2 | 7/2007 | Eiron et al. | |
| 7,716,202 B2 | 5/2010 | Slackman | |
| 7,756,867 B2 | 7/2010 | Sue | |
| 7,761,448 B2 | 7/2010 | Meyerzon et al. | |
| 7,783,632 B2 | 8/2010 | Richardson et al. | |
| 7,814,085 B1 | 10/2010 | Pfleger et al. | |
| 7,814,099 B2 | 10/2010 | Wang | |
| 7,822,751 B2 | 10/2010 | O'Clair et al. | |
| 7,917,503 B2 | 3/2011 | Mowatt et al. | |
| 8,065,619 B2 * | 11/2011 | Agarwal et al. | 715/742 |
| 8,250,066 B2 * | 8/2012 | Miedema | 707/723 |
| 2004/0199419 A1 * | 10/2004 | Kim et al. | 705/14 |
| 2010/0125570 A1 | 5/2010 | Chapelle et al. | |
| 2010/0131563 A1 * | 5/2010 | Yin | 707/794 |
| 2010/0223258 A1 | 9/2010 | Ghahramani et al. | |

OTHER PUBLICATIONS

Brin, S. and Page, L., The Anatomy of a Large-Scale Hypertextual Web Search Engine [online], [retrieved on Jul. 23, 2009]. Retrieved from the Internet: http://infolab.stanford.edu/pub/papers/google.pdf, 20 pages.

(Continued)

*Primary Examiner* — Cam-Linh Nguyen
(74) *Attorney, Agent, or Firm* — Fish & Richardson P.C.

(57) ABSTRACT

Methods, systems, and apparatus, including computer program products, for testing web search scoring functions. A query is received. A first and a second scoring function are selected by receiving search results responsive to the query; applying candidate scoring functions to the search results to determine scores for the search results for each candidate scoring function; identifying pairs of the candidate scoring functions, and calculating a diversity score for each of the pairs. A pair of candidate scoring functions is chosen from the one or more pairs of candidate scoring functions based on the diversity scores, and the alpha function is selected as the first scoring function and the beta function is selected as the second scoring function. The plurality of search results are presented in an order according to scores from the first scoring function and are presented in an order according to scores from the second scoring function.

25 Claims, 8 Drawing Sheets

(56) References Cited

OTHER PUBLICATIONS

Changing the Ranking of Your Search Results—Google Custom Search API—Google Code [online], [retrieved Feb. 26, 2009]. Retrieved from the Internet: http://code.google.com/apis/customsearch/docs/ranking.html, 20 pages.

Chapter 2. Web Search [online], [retrieved on Feb. 26, 2009]. Retrieved from the Internet: http://developer.yahoo.com/search/boss/boss_guide/Web_Search.html, 3 pages.

Chapter 4. Image Search [online], [retrieved on Feb. 26, 2009][. Retrieved from the Internet: http://developer.yahoo.com/search/boss/boss_guide/Submit_Image_Queries.html, 1 page.

Chapter 5. News Search [online], [retrieved on Feb. 26, 2009]. Retrieved from the Internet: http://developer.yahoo.com/search/boss/boss_guide/News_Search.html, 1 page.

Mease, D., "A Penalized Maximum Likelihood Approach for the Ranking of College Football Teams Independent of Victory Margins", 2003, University of Michigan, Department of Statistics, 17 pages.

The Basics—Google Custom Search API—Google Code [online], [retrieved on Feb. 26, 2009]. Retrieved from the Internet: http://code.google.com/apis/customsearch/docs/basics.html, 8 pages.

\* cited by examiner

FRAMEWORK FOR EVALUATING WEB SEARCH SCORING FUNCTIONS

CROSS-REFERENCE TO RELATED APPLICATIONS

This application is a continuation of, and claims the benefit of priority under 35 U.S.C. 120 to, U.S. application Ser. No. 12/508,023, filed Jul. 23, 2009, which is incorporated herein in its entirety.

BACKGROUND

This specification relates to using and evaluating web search scoring functions.

Internet search engines provide information about Internet accessible resources (e.g., Web pages, images, text documents, multimedia content) that are responsive to a user's search query by returning a set of search results in response to the query. A search result includes, for example, a Uniform Resource Locator (URL) and a snippet of information for resources responsive to a query. The search results can be ranked (e.g., in an order) according to scores assigned to the search results by a scoring function. Different scoring functions can assign different scores to the search results.

SUMMARY

This specification describes technologies relating to testing web search scoring functions.

In general, one aspect of the subject matter described in this specification can be embodied in a method that includes the acts of receiving a first query and selecting a first and a second candidate scoring function from a plurality of candidate scoring functions. The selecting includes receiving a plurality of first search results responsive to the first query; applying each of the candidate scoring functions to the plurality of first search results to determine respective scores for the first search results for the candidate scoring function; identifying one or more pairs of candidate scoring functions from the candidate scoring functions, each pair comprising a respective alpha candidate scoring function and a respective beta candidate scoring function; calculating a respective diversity score for each of the pairs of candidate scoring functions, where the diversity score measures diversity between a number of highest ranked first search results ordered according to the respective scores for the alpha candidate scoring function and a number of highest ranked first search results ordered according to the respective scores for the beta candidate scoring function; and selecting the respective alpha candidate scoring function for a first pair of candidate scoring functions as the first scoring function and the respective beta candidate scoring function for the first pair as the second scoring function, where the first pair of candidate scoring functions is chosen from the one or more pairs of candidate scoring functions based on the respective diversity scores. The method further includes presenting the plurality of first search results ordered according to scores from the first scoring function; and presenting the plurality of first search results ordered according to scores from the second scoring function. Other implementations include corresponding systems, apparatus, computer program products, and computer storage media.

These and other implementations can optionally include one or more of the following features. First input selecting the first scoring function over the second scoring function can be received, and an order for the plurality of scoring functions can be generated based on the first input.

A second query can be received. A plurality of second search results responsive to the second query can be received. A third candidate scoring function and a fourth candidate scoring function can be selected from the plurality of scoring functions. The plurality of second search results can be presented ordered according to the third scoring function, and the plurality of second search results can be presented ordered according to the fourth scoring function. Second input selecting the third scoring function over the fourth scoring function can be received, and generating the order of the plurality of scoring functions is based on the first input and the second input. It can be detected that the second input is suspicious, and generating the order of the plurality of scoring functions can include giving more weight to the first input than to the second input. Detecting that an input is suspicious can include examining a history of inputs.

The plurality of first search results can have a first order according to the respective scores for the first candidate scoring function. A notification that the first scoring function has been modified can be received, and the modified first scoring function can be applied to the plurality of first search results to determine modified scores for the first search results. A second order for the first search results can be generated according to the modified scores. It can be determined that the first order and the second order are different, and the order of the plurality of scoring functions can be modified so that the modified order of the plurality of scoring functions does not reflect the first input.

The first query can be classified and the classification can be used to select the plurality of candidate scoring functions from a plurality of available scoring functions. The plurality of candidate scoring functions from a plurality of available scoring functions based on a respective score associated with each scoring function.

Calculating the diversity score for an alpha scoring function and a beta scoring function can include comparing an alpha search result in a first position in an order of search results according to the scores for the alpha candidate scoring function and a beta search result in the first position in an order of search results according to the scores for the beta candidate scoring function.

Applying a candidate scoring function to the plurality of first search results can further include providing signals including information about the query and each search result in the plurality of first search results to the candidate scoring function.

Particular embodiments of the subject matter described in this specification can be implemented so as to realize one or more of the following advantages. Existing search engine infrastructure can be leveraged to allow users to experiment with various scoring functions without large implementation overhead. The performance of different scoring functions can be compared. An ordering can be generated for scoring functions based on pair-wise comparisons of the scoring functions, even if all of the scoring functions have not been compared to the each of the other scoring functions. Evaluations from questionable evaluators can be discounted. A market for scoring function evaluations, in which evaluators are rewarded with incentives, can be generated. A contest, in which teams of users submit scoring functions and evaluate each other's scoring functions, can be run.

The details of one or more embodiments of the subject matter described in this specification are set forth in the accompanying drawings and the description below. Other features, aspects, and advantages of the invention will become apparent from the description, the drawings, and the claims.

In general, another aspect of the subject matter described in this specification can be embodied in a method that includes the acts of receiving a plurality of scoring functions from a plurality of users; receiving a query, data indicating a selection of a scoring function from the plurality of scoring functions, and one or more scoring parameters; receiving a subset of a set of search results responsive to the query and a plurality of scoring signals for each search result from a search engine; applying the scoring function to each search result in the subset to determine a score for each search result, where applying the scoring function to each search result includes encoding one or more of the plurality of scoring signals for the search result as a message, sending the message to the scoring function, and receiving a message with the score for the search result from the scoring function; and presenting the subset of search results according to the score for each search result. Other implementations include corresponding systems, apparatus, computer program products, and computer storage media.

BRIEF DESCRIPTION OF THE DRAWINGS

Like reference numbers and designations in the various drawings indicate like elements.

DETAILED DESCRIPTION

Figure 1A:
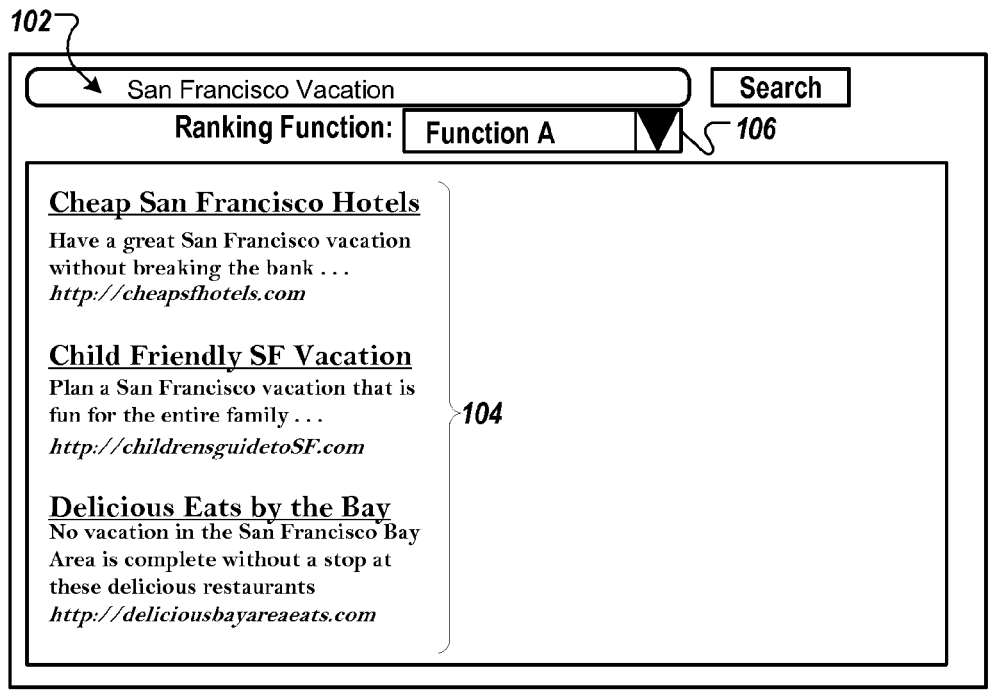
FIGS. 1A and 1B illustrate example graphical user interfaces displaying search results in response to a query, where the search results are ranked based on scores from different scoring functions.
Figure 1B:
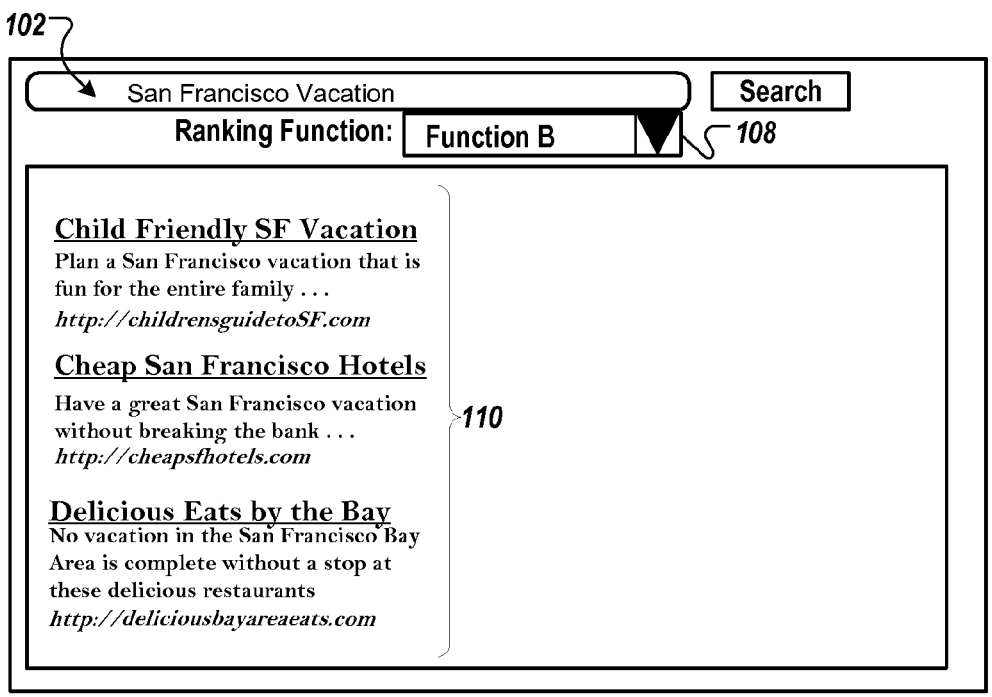

FIGS. 1A and 1B illustrate example graphical user interfaces displaying search results in response to a query, where the search results are ranked based on scores from different scoring functions. In general, a scoring function receives one or more signals for a search result and a query and uses the received signals to generate a score for the search result for the query. Signals can include, for example, information about the query itself, information about the terms of the query, information about the search result itself, information about anchor text for links pointing to the search result from other documents, and information about the search result and the query. Other signals are also possible. Once the scores are generated using a scoring function, the search results can be ranked based on their scores (e.g., ranked from highest score to lowest score, or lowest score to highest score).

In FIG. 1A, the query "San Francisco Vacation" 102 is submitted to a search engine, through the graphical user interface, and a set of search results 104 that are responsive to the query 102 are generated by the search engine and presented in the user interface. The search results are ranked according to scores from a first scoring function (Function A 106), selected by the user. In FIG. 1B, a different scoring function (Function B 108) is selected, and the search results 110 are ranked in a different order.

Figure 1C:
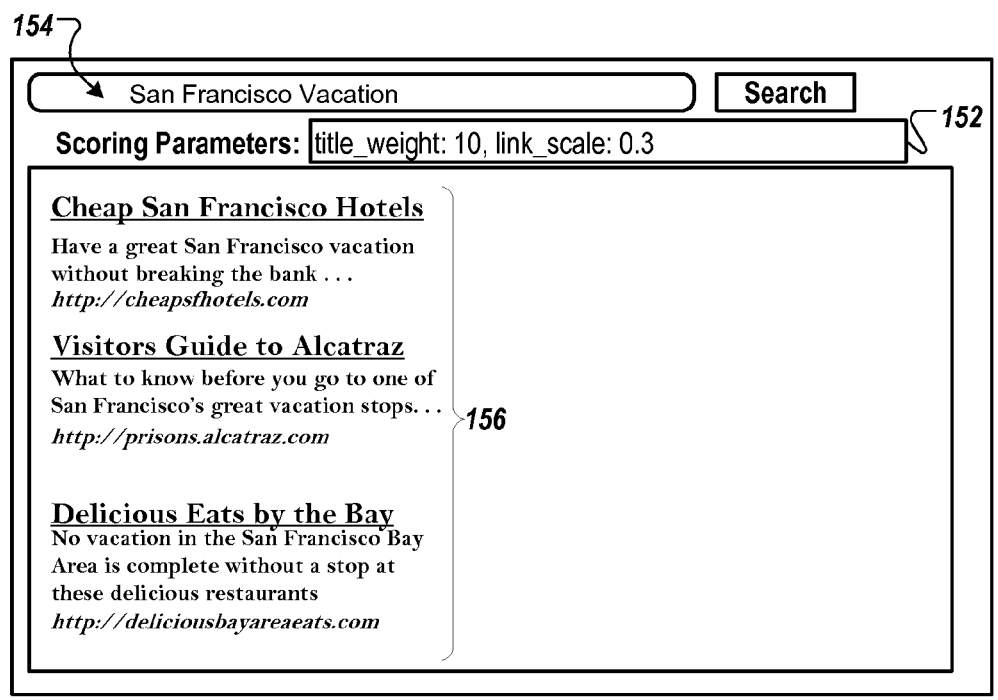
FIG. 1C illustrates an example graphical user interface for providing values for scoring parameters and a query to a search system.

FIG. 1C illustrates an example graphical user interface for providing values for scoring parameters 152 and a query 154 to a search system.

The user interface shown in FIG. 1C is used to submit the query "San Francisco Vacation" 154 to a search engine, along with scoring parameters "title_weight: 10, link_scale: 0.3" 152. Search results 156 responsive to the query and ranked by a scoring function using the scoring parameters are then presented in the user interface.

In general, a scoring function can specify that it takes one or more scoring parameters in addition to signals for a search result and a query. A scoring function uses the scoring parameters to calculate a score for a search result. The scoring parameters allow the user submitting the search query to tune the performance of the scoring function, and can specify values for variables specific to the scoring function. Examples of scoring parameters include an amount to add to the score if a term is in the title of the search result, an amount to add to the score if a term is in the URL of the search result, a weight to give a term in an anchor relative to a weight to give term in the body of the search result, or various thresholds to use in the scoring algorithm (for example, the number of times a term can appear in the body of the search result before subsequent appearances are discounted). For example, the scoring parameters 152 illustrated in FIG. 1C include an amount to add to the score if a term is in the title and an amount by which to scale the score if a term is in an anchor.

While FIGS. 1A-1C show a visual display of search results, presenting search results can include various forms of presentation including, for example, displaying search results on a display device, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Figure 2:
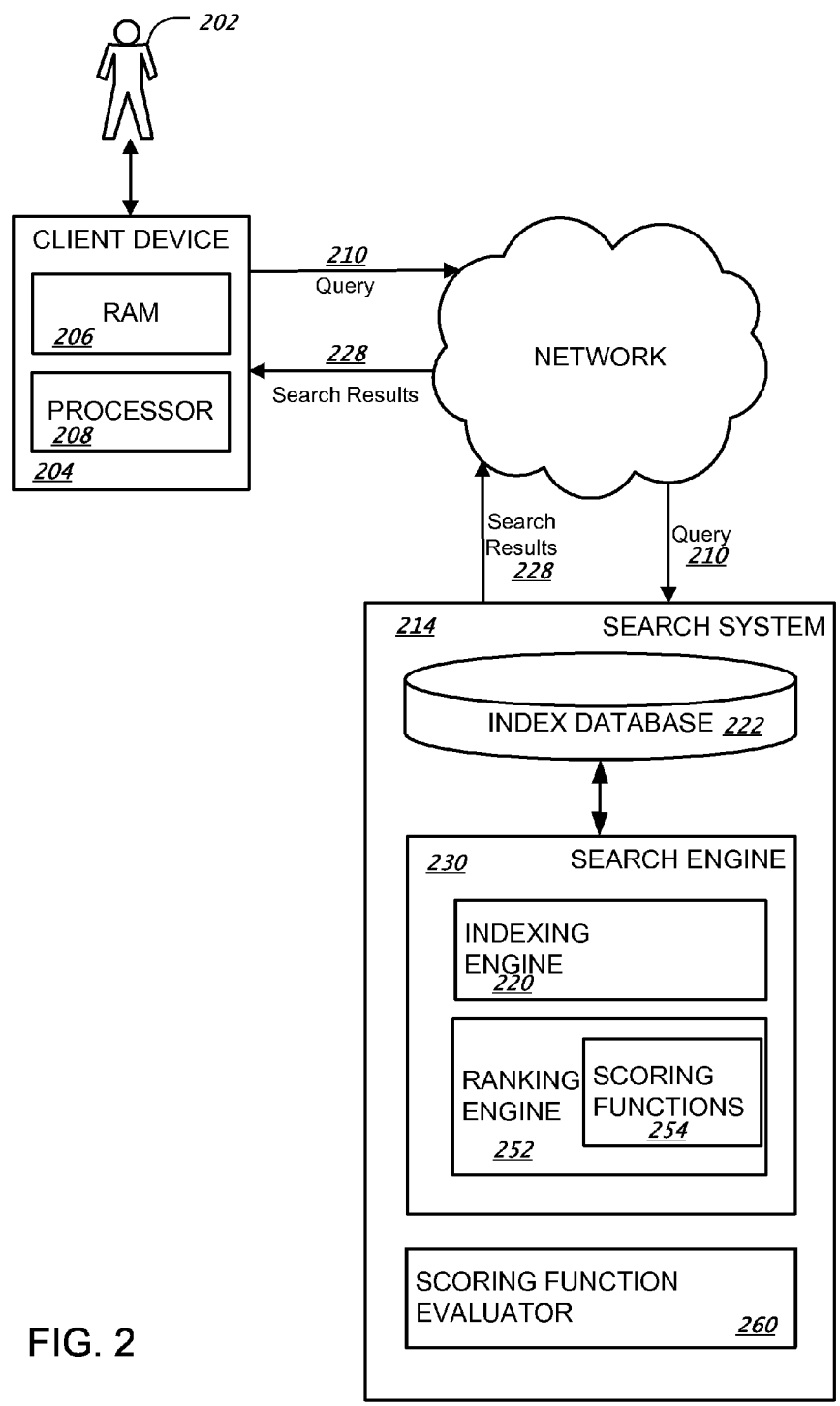
FIG. 2 illustrates an example search system for providing ranked search results relevant to submitted queries.

FIG. 2 illustrates an example search system 214 for providing ranked search results relevant to submitted queries as can be implemented in an internet, an intranet, or another client and server environment. The search system 214 is an example of an information retrieval system in which the systems, components, and techniques described below can be implemented. The search system 214 can be used, for example, to generate ordered sets of search results 104, 110, and 156 shown in FIGS. 1A-1C.

A user 202 can interact with the search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

A user 202 can submit a query 210 to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network. The search system 214 includes an index database 222, a search engine 230, and a scoring function evaluator 260. The search system 214 responds to the query 210 by generating search results 228, which are transmitted through the network to the client device 204 in a form that can be presented to the user 202 (e.g., a search results web page to be displayed in a web browser running on the client device 204).

When the query 210 is received by the search engine 230, the search engine 230 identifies resources that match the query 210. The search engine 230 may also identify a particular "snippet" or section of each resource that is relevant to the query (or of the highest ranked resources that are relevant to the query). The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210.

The indexing engine 220 can index information using traditional techniques.

The ranking engine 252 generally has access to one or more scoring functions 254 that are, for example, associated with the ranking engine 252 or the scoring function evaluator 260. In some implementations, the search system 214 receives scoring functions from one or more users and stores the received functions. For example, one or more users can upload scoring functions to the search system 214 through a user interface. Each scoring function can be associated with the user who submitted it to the search system.

The ranking engine 252 selects a scoring function from the set of scoring functions 254. The ranking engine 252 can base the selection on user input (for example, when a user selects a function as shown in FIG. 1A, the ranking engine can use that function). Alternatively, the ranking engine 252 can select a scoring function based on instructions received from a scoring functions evaluator 260. In some implementations, the ranking engine 252 can select multiple scoring functions and send multiple sets of ranked search results, one corresponding to each selected scoring function, to the client device 204.

The ranking engine 252 ranks search results that are responsive to the query by determining one or more signals for the search result and the query, sending those signals to one of the scoring functions 254, receiving a score from the scoring function for each search result, and then ranking the search results based on the received scores. The ranking engine and scoring functions can communicate according to commands specified in an application programming interface (API). In general, the API specifies interfaces used by the ranking engine and the scoring function to implement and invoke a series of commands for sharing data. For example, the API can specify a command used by a scoring function to receive scoring data from the ranking engine, or can specify a command used by a ranking engine to request a score from a scoring function. In some implementations, data is passed between the scoring function and the ranking engine in messages encoded according to a messaging format. The messaging format can be specified by the API, or can be separate from the API.

Examples of signals include information about the query itself, for example, the terms of the query, an identifier of the user who submitted the query, and a categorization of the user who submitted the query (e.g., the geographic location from where the query was submitted, the language of the user who submitted the query, interests of the user who submitted the query, or a type of the client device 204 used to submit the query (e.g., mobile device, laptop, desktop)). The identification of the user can be, for example, a user name or the IP address of the client device 204. The geographic location from where the query was submitted can be, for example, a continent, a country, a state, a city, or geographic coordinates, such as latitude and longitude.

Signals can also include information about the terms of the query, for example, the locations where a query term appears in the title, body, and text of anchors in a search result, where a query term appears in anchors pointing to the search result, how a term is used in the search result (e.g., in the title of the search result, in the body of the search result, or in a link in the search result), the term frequency (i.e., the number of times the term appears in a corpus of documents in the same language as the query divided by the total number of terms in the corpus), and the document frequency (i.e., the number of documents in a corpus of documents that contain the query term divided by the total number of documents in the corpus).

Further examples of signals include information about the search result, for example, a measure of the quality of the search result, the URL of the search result, the geographic location where the search result is hosted, when the search system 214 first added the search result to the index database 222, the language of the search result, the size of the search result (e.g., number of tokens or file size), the length of the title of the search result, and the length of the text of source anchors for links pointing to the document.

Other examples of signals include information about anchor text for links pointing to the search result, for example, the text itself and the total number of tokens (e.g., words) in the anchor text. For example, if an anchor pointing to the search result has the text "NY" and another anchor has the text "New York," then the signals can include the text "NY" and "New York" as well as the number of tokens in the text: one from "NY" and two from "New York" for a total of three tokens. Other anchor signals for links pointing to the search result include the number of documents in the domain of the search result that have a link pointing to the search result with given anchor text, and the number of documents from different domains than the search result that have a link pointing to the search result with given anchor text.

The ranking engine 252 may also provide additional information to the scoring function, for example, scoring parameters. In some implementations, the search system 214 receives the scoring parameters with the query 210, for example, as described above in reference to FIG. 1C.

In some implementations, the search system 214 includes a scoring function evaluator 260. The scoring function evaluator instructs the ranking engine 252 to use particular scoring functions and generates a ranking for the scoring functions based on input received from a user. For example, in response to a query, the scoring function evaluator 260 can select a pair of scoring functions and instruct the ranking engine 252 to rank the search results responsive to the query using the two selected scoring functions. The scoring function evaluator 260 can then receive input selecting one of the scoring functions over the other. The scoring function evaluator 260 can repeat this process for each received query, and use the results of the pair-wise comparisons to generate an order for the scoring functions. In some implementations, the scoring function evaluator can be used to run a contest in which teams of one or more users submit scoring functions for evaluation, the scoring function evaluator 260 evaluates the functions, and the results of the evaluation are presented.

Figure 3:
FIG. 3 illustrates an example graphical user interface for presenting two sets of search results in response to the same query, where the search results are ranked according to two different scoring functions.

FIG. 3 illustrates an example graphical user interface for presenting two sets of search results 306 and 308 in response to the same query, where the search results are ranked according to two different scoring functions. The user interface shown in FIG. 3 can be used, for example, to present sets of search results ranked according to scoring functions selected by the scoring function evaluator 260 and to collect input selecting one of the scoring functions over the other for use by the scoring function evaluator 260.

As shown in FIG. 3, two sets of search results are presented in response to the query "San Francisco Vacation" 302. The first set 306, ranks responsive search results according to scores received from a first scoring function. The second set 308 ranks responsive search results according to scores received from a second scoring function. A user can select one set of search results over the other by clicking (e.g., with a mouse or other input device) on the appropriate select button 310 or 312. The user can indicate that the two search results are equally good by clicking on the tie button 314. The scoring function evaluator 206 records the selection of one set of search results over another set of search results as a selection of the scoring function corresponding to the selected set of search results over the scoring function corresponding to the other set of search results. The scoring function evaluator 206 records a tie as a draw between the two corresponding scoring functions.

In some implementations, when the user selects one set of search results over the other, the scoring function evaluator 206 also receives information identifying the particular user, a scoring function associated with the user, or both. A user can be associated with a particular scoring function by providing input through the user interface that identifies a particular scoring function (for example, by providing input specifying the function or the name of a team associated with the function). The scoring function evaluator 206 can track the number of inputs received from users associated with each scoring function as a measure of karma for the scoring function. In general, karma is a count of how many inputs have been received from users associated with each scoring function. In some implementations, the karma can be used, for example, to determine which scoring functions are tested the most frequently.

Figure 4:
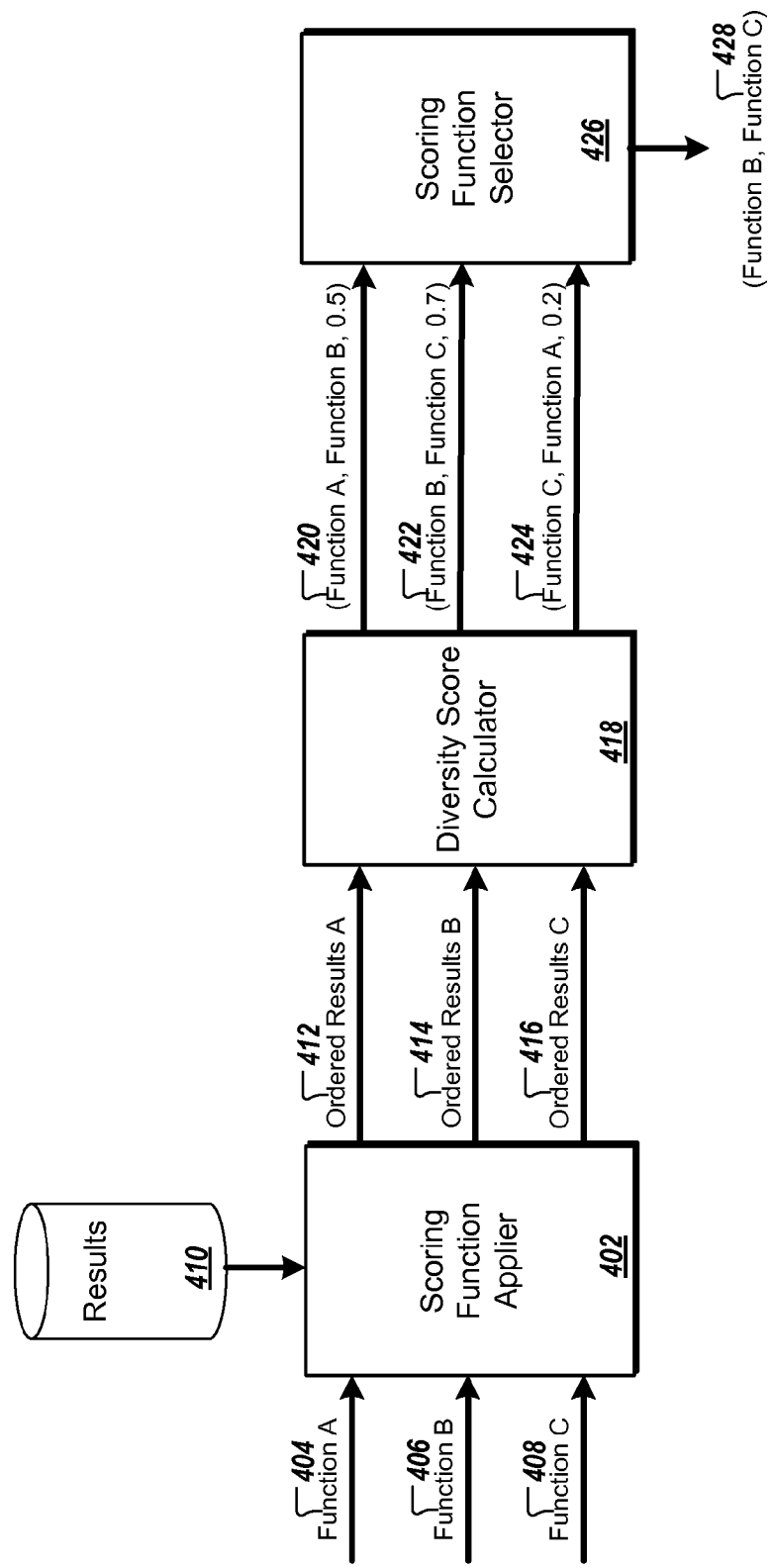
FIG. 4 illustrates an example of selecting two diverse scoring functions.

FIG. 4 illustrates an example of selecting two diverse scoring functions. The technique illustrated in FIG. 4 can be used, for example, by the scoring function evaluator 260 to select a pair of scoring functions.

A scoring function applier 402 receives scoring functions (e.g., Function A 404, Function B 406, and Function C 408) and a set of search results 410. The scoring function applier 402 applies each scoring function to the set of results 410 by providing one or more signals for each search result to the scoring function and receiving a score for each search result from the scoring function. The scoring function applier 402 then generates an order for the search results for each scoring function using the scores from the scoring function. For example, Ordered Results A 412 correspond to the scores from Function A 404, Ordered Results B 414 correspond to the scores from Function B 406, and Ordered Results C 416 correspond to the scores from Function C 408.

A diversity score calculator 418 receives the ordered search results (or a number of the top ordered search results) corresponding to each scoring function. The diversity score calculator identifies pairs of scoring functions (for example, Function A and Function B, Function A and Function C, and Function B and Function C), and calculates a diversity score for each pair. The diversity score measures the diversity between the two ordered sets of search results corresponding to the scoring functions in the pair. For example, in FIG. 4, Ordered Results A 412 and Ordered Results B 414 are assigned a diversity score 420 of 0.5, Ordered Results B 414 and Ordered Results C 416 are assigned a diversity score 422 of 0.7, and Ordered Results C 416 and Ordered Results A 412 are assigned a diversity score 424 of 0.2.

In some implementations, the diversity score calculator 418 calculates a diversity score based on comparisons of search results in the same position in the two ordered sets of search results. The diversity score calculator 418 can compare all of the search results in the same position in each order, or compare the search results in a top number of positions in each order (for example, the first through tenth search results in each order). For example, the diversity score calculator 418 can count how many times the same search results are in the same position in both ordered sets. The diversity score can then be, for example, the count itself (in implementations where lower diversity scores indicate greater diversity) or the inverse of the count (in implementations where higher diversity scores indicate greater diversity). The diversity score can also be a binary value, for example, a value of one when a threshold number of positions have different search results, and a value of zero otherwise. Examples of thresholds include two out of the top two results, or six out of the top ten results. In some implementations, two search results are the same when they are identical (e.g., have the same URL). Alternative measures of similarity are also possible, for example, based on a comparison of the text of the titles of the search results, the domains corresponding to the search results, or the search results themselves.

In some implementations, differences in the top ranked search results are given more weight than differences in lower ranked search results when calculating the diversity score.

In alternative implementations, the diversity score is calculated based on a measure of similarity between a top number (n) of search results in each order. For example, the diversity score can be the cosine distance (in implementations where lower diversity scores indicate greater diversity) or the inverse of the cosine distance (in implementations where higher diversity scores indicate greater diversity) between a top number of search results in each order.

A Scoring Function Selector 426 receives the diversity scores 420, 422, and 424 and selects a pair of scoring functions based on the diversity scores. For example, when higher diversity scores indicate a higher diversity in search results, the Scoring Function Selector 426 can select the pair with the highest score (e.g., pair Function B and Function C 428), or can select a pair whose diversity score exceeds a threshold (e.g., a predetermined threshold).

Figure 5:
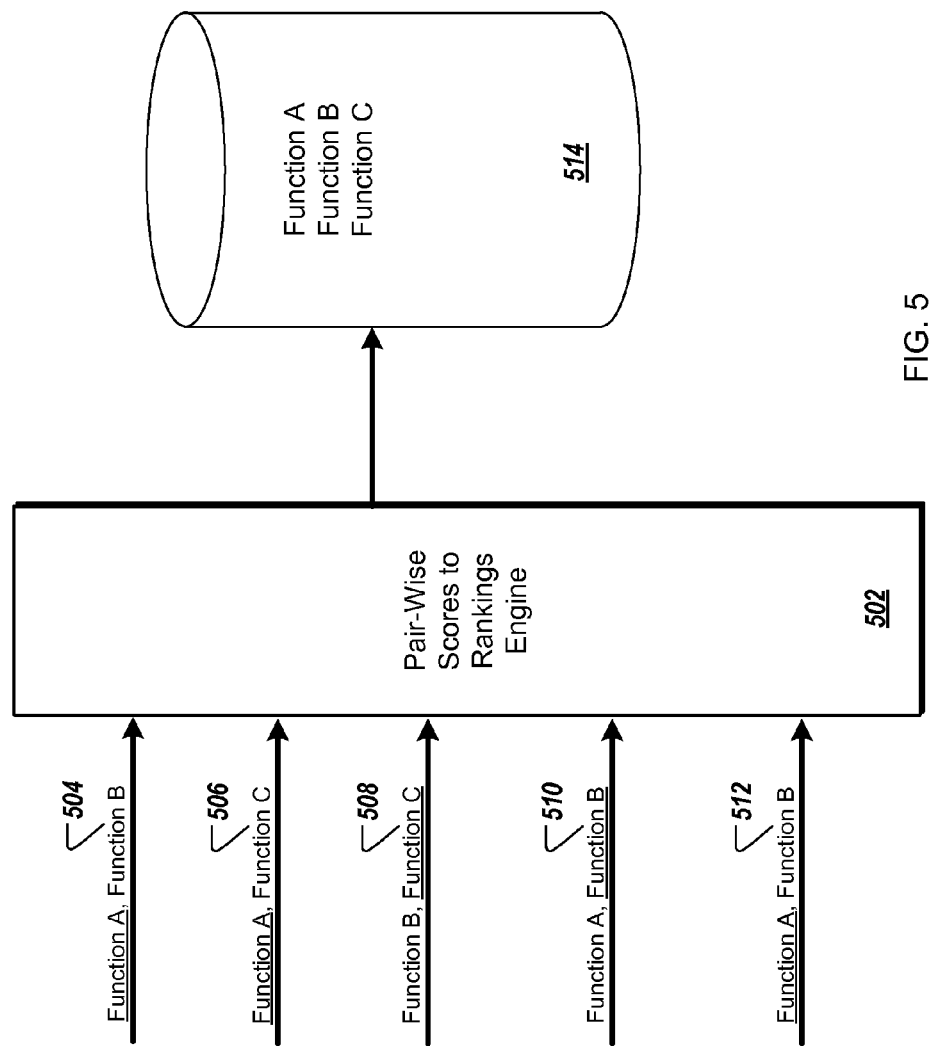
FIG. 5 illustrates an example of ranking scoring functions based on a series of pair-wise comparisons of scoring functions.

FIG. 5 illustrates an example of ranking scoring functions based on a series of pair-wise comparisons of scoring functions. The technique illustrated in FIG. 5 can be used, for example, by the scoring function evaluator 260 to rank scoring functions.

The pair-wise scores to rankings engine 502 receives a number of pair-wise comparisons of scoring functions (e.g., comparison 504, comparison 506, comparison 508, comparison 510, and comparison 512). Each comparison corresponds to the selection of one scoring function over the other as indicated by the line under the selected function. For example, comparison 504 corresponds to the selection of Function A over Function B.

The pair-wise scores to rankings engine 502 generates an order for the scoring functions, for example, using standard algorithms for converting pair-wise scores to an overall ranking, for example, algorithms used to rank football teams. In some implementations, the pair-wise scores to rankings engine 502 generates an ad hoc order for the scoring functions based on an analysis of the pair-wise comparisons. For example, in the comparisons shown in FIG. 5, Function A is always selected over the other functions, Function B is always selected over Function C but not Function A, and Function C is never selected over the other functions. The pair-wise scores to rankings engine 502 can analyze the comparisons and determine that since Function A was always selected over the other scoring functions, it should be ranked first, since Function B was always selected over Function C, it should be ranked second, and since Function C was never selected, it should be ranked last.

In alternative implementations, the pair-wise scores to rankings engine 502 applies a more systematic approach to generating the order for the scoring functions from the pair-wise comparisons. For example, the pair-wise scores to rankings engine 502 can rank the scoring functions based on the proportion of the evaluations where each scoring function has been selected. For example, the pair-wise scores to rankings engine 502 can score a given scoring function according to the formula:

$$\frac{(2 \times wins + draws)}{2 \times trials},$$

where wins is the number of times the given scoring function was selected over another scoring function, draws is the number of times the given scoring function tied another scoring function, and trials is the total number of pair-wise comparisons for the given scoring function. The scoring functions can then be ordered based on their scores.

Other methods for generating the order can also be used. For example, the pair-wise scores to rankings engine 502 can rank the scoring functions so as to result in the minimum disagreements between the pair-wise comparisons and the order of the scoring functions. A disagreement arises when a first scoring function is selected over a second scoring function in a pair-wise comparison, but the second scoring function has a better position in the order. Traditional combinatorial algorithms can be used to generate an order with minimum disagreements.

As another example, the pair-wise scores to rankings engine 502 can score the nodes using a graph with nodes corresponding to the scoring functions and an edge from a first node to a second node for each time the second node is selected over the first node in a pair-wise comparison. The pair-wise scores to rankings engine applies a ranking algorithm as follows. The pair-wise scores to rankings engine originally assigns equal scores to the nodes, and then recursively updates the scores for each given node based on the scores of the nodes with edges that point to the given node, until a certain threshold is reached. The score for a node i is calculated as follows:

$$score(i) = \sum_{j \in nodes} \frac{score(j)}{L(j)},$$

where L(j) is the number of outbound links from node j, and nodes is the set of nodes with an edge to node i. In some implementations, a dampening factor is applied to the summation. For example, the score for node i with a dampening factor can be calculated as follows:

$$score(i) = \frac{1-d}{N} + d \sum_{j \in nodes} \frac{score(j)}{L(j)}.$$

The dampening factor d can be determined empirically. The scoring functions can then be scored (and ranked) based on the scores of the corresponding nodes in the graph.

As another example, the pair-wise scores to rankings engine 502 can use an approach based on David Mease's college football team ranking algorithm (Mease, David. A Penalized Maximum Likelihood Approach for the Ranking of College Football Teams Independent of Victory Margins, The American Statistician, November 2003). For example, each scoring function can be assumed to perform according to a normal distribution with a mean of $\theta_i$. The higher $\theta_i$ is, the better the scoring function is in general. When two scoring functions are compared on a random query, the probability that a first scoring function will be selected over a second scoring function can be represented as $\Phi(\theta_1 - \theta_2)$. Under these assumptions, $\theta_i$ can be determined for each scoring function to maximize a likelihood function $$l(\theta) = \prod_{(i,j) \in S} [\Phi(\theta_i - \theta_j)]^{n_{ij}} \times \prod_{i=1}^{n} \Phi(\theta_i)\Phi(-\theta_i),$$

where S is the set of pairs of scoring functions (i, j) where scoring function i was selected over scoring function j in the pair-wise comparisons, and $n_{ij}$ is the number of times scoring function i was selected over scoring function j in the pair-wise comparisons.

The first part of the likelihood function $l(\theta)$:

$$\prod_{(i,j) \in S} [\Phi(\theta_i - \theta_j)]^{n_{ij}}$$

accounts for both the win-loss record for each scoring function, as well as the strength of the scoring functions each function is compared to, while the second part of the likelihood function $l(\theta)$:

$$\prod_{i=1}^{n} \Phi(\theta_i)\Phi(-\theta_i)$$

is a dampening factor that ensures $l(\theta)$ remains finite.

Once $l(\theta)$ is maximized as a function of $\theta$, the scoring functions can be ranked based on their respective $\theta$ values, for example, in decreasing order of $\theta$.

In some implementations, the pair-wise scores to rankings engine 502 also generates a measure of confidence for the ranking assigned to each scoring function. The measure of confidence is an estimate of how likely it is that the ranking for the scoring function is correct, and can be, for example, a confidence interval indicating the upper and lower bounds of the ranking for the scoring function. For example, if a scoring function assigned a ranking of 10 has a confidence interval of 2, the confidence interval indicates the correct ranking for the scoring function is likely between 8 and 12. The pair-wise scores to rankings engine 502 can calculate the measure of confidence using the pair-wise comparisons received for all of the scoring functions. For example, the confidence interval for a scoring function can be determined by calculating the standard deviation of the score for the scoring function (e.g., θ, or any of the other measures of score described above), adding and subtracting the standard deviation from the score, resulting in a low score and a high score, and determining the difference in rank between a scoring function having the low score and a scoring function having a high score. For example, if a scoring function has a score of 150 with a standard deviation of 10, the low score of 140=150−10 and the high score of 160=150+10 are calculated. A hypothetical rank is determined for a scoring function having a score of 140 and a scoring function having a score of 150. The difference in the ranks is the confidence interval. Other standard statistical techniques can also be used to calculate the confidence interval.

Figure 6:
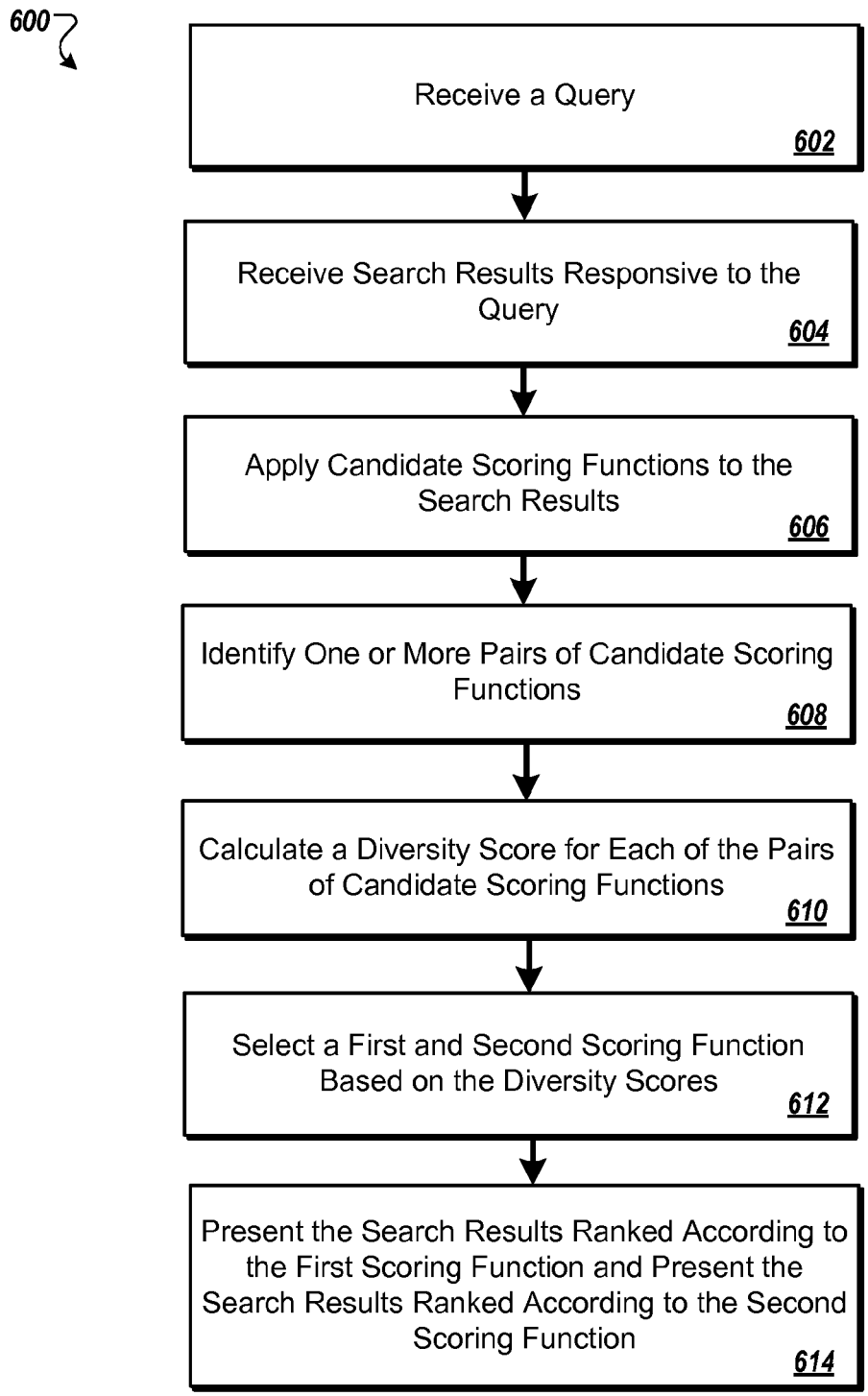
FIG. 6 illustrates an example method for selecting a pair of candidate scoring functions.

FIG. 6 illustrates an example method for selecting a pair of candidate scoring functions. For convenience, the example method 600 will be described in reference to a system that performs the method 600. The system can be, for example, the scoring function evaluator 260.

The system receives a query (602). The system can receive the query, for example, from a user or a search system (e.g., the search system 214).

The system receives search results responsive to the query (604), for example, from the search engine 230.

The system applies candidate scoring functions to the search results (606). The system can apply the candidate scoring functions to the search results by determining one or more signals for the query and each search result, providing the signals to the candidate scoring function, and receiving a score for each candidate search result from the scoring function, for example, as described above in reference to FIGS. 2 and 4. In some implementations, the system also provides one or more scoring parameters to each candidate scoring function, for example, as described above in reference to FIG. 2.

In some implementations, the system selects the candidate scoring functions from one or more available scoring functions. The system can select the candidate scoring functions, for example, based on one or more of a classification of the query, karma associated with the scoring functions, or a rank of the scoring functions.

The system can classify the query based on the characteristics of the query or the subject matter of the query. For example, the system can classify queries having more than a threshold number of characters as "long queries" and can classify queries having less than a threshold number of characters as "short queries." As another example, the system can classify queries that occur in recent query logs more than a threshold number of times as "popular queries," and can classify queries that do not occur in recent query logs more than a threshold number of times as "unpopular queries." As yet another example, the system can classify queries that include terms indicating commercial activity (e.g., terms such as "deal," "price," "buy," "store," etc.) as "commercial queries," and can classify queries that do not contain those terms as "non-commercial queries." As another example, the system can classify queries based on topic, for example, queries based on travel, queries based on food, queries based on current events, etc. In some implementations, the system selects candidate scoring functions that have been tested fewer times than other scoring functions on queries having the classification (e.g., to increase the diversity of queries used to test each scoring function). In alternative implementations, the system only selects a candidate scoring function when the query has one or more particular types of classifications (e.g., to restrict candidate scoring functions to certain types of queries).

The system can calculate the karma associated with a given scoring function by analyzing data stored for the scoring function. The data can indicate, for example, the number of evaluations of scoring functions performed by users associated with the scoring function. In some implementations, the system selects scoring functions with higher karma more often than the system selects scoring functions with lower karma. In some implementations, the system only selects scoring functions with karma exceeding a given threshold. The threshold can be empirically determined.

The system can determine the rank of the scoring function, for example, by maintaining an order of the scoring functions (e.g., based on pair-wise comparison data). In some implementations, the system selects a top number of the available scoring functions in the order.

In one exemplary implementation, the system obtains a list of available scoring functions, sorts the list by the karma associated with each scoring function, and removes the scoring function associated with the user performing the rating. The system then classifies the query, and iterates through the list of scoring functions in order, selecting as candidate scoring functions the scoring functions that have been evaluated on less than a threshold proportion of the queries. The iteration continues until the desired number of candidate scoring functions have been selected.

The system identifies one or more pairs of candidate scoring functions (608). Each pair includes two scoring functions, which for convenience will be called an alpha scoring function and a beta scoring function.

The system calculates a diversity score for each of the pairs of candidate scoring functions (610). The diversity score measures diversity between a number of highest ranked search results ordered according to scores from the alpha scoring function and a number of highest ranked search results ordered according to scores from the beta scoring function. The system can calculate the diversity score, for example, as described above in reference to FIG. 4.

The system selects a first and second scoring function based on the diversity scores (612). The first and second scoring function are selected by identifying a pair of candidate scoring functions and selecting the alpha scoring function from the pair as the first candidate scoring function and selecting the beta scoring function from the pair as the second scoring function. The pair can be identified, for example, as described above in reference to FIG. 4.

The system presents the search results according to the first scoring function and the system presents the search results according to the second scoring function (614). The system can present the search results, for example, using the user interface described above in reference to FIG. 3.

In some implementations, after the system presents the search results according to the first and second scoring function, the system receives input selecting the first candidate scoring function over the second candidate scoring function. In some implementations, a user provides the input, for example, through the user interface described above in reference to FIG. 3. The input can include additional information, for example, an identification of the user who provides the input or an identification of a scoring function or a team associated with the user.

In some implementations, the system stores the input and optionally other information, such as the query, a classification of the query, any signals and scoring parameters provided to the two scoring functions, which search results were ranked in a top number of positions for each scoring function, or all of the entire set of search results corresponding to the query. In some implementations, the system only stores the input and any other information for a threshold number of comparisons (e.g., the last one-hundred or two-hundred comparisons for each scoring function), or a threshold amount of time (e.g., the last week, month, or quarter).

The system uses the input to generate or modify an order for the scoring functions, for example, as described above in reference to FIG. 5. In some implementations, the system processes each input as it is received, and modifies the order when appropriate. In alternative implementations, the system periodically generates an order for the scoring functions based on input received during a given period, or stored at the end of a given period. The period can be defined by, for example, a period of time or a number of inputs.

In some implementations, the system uses the order for the scoring functions to generate a score for one or more scoring functions. In general, the score reflects how the scoring function is ranked relative to other scoring functions. For example, if a scoring function is ranked 3 out of 100, it can be assigned a score of 97, indicating that it is better than 97% of the scoring functions.

In some implementations, the system detects that a given input is suspicious (e.g., likely false), and gives more weight to the other inputs than the suspicious input when generating or modifying the order for the scoring functions.

An input can be suspicious, for example, when the system determines, e.g., from an analysis of the user's behavior, that the input is likely false. An input can be false, for example, when the user fails to objectively evaluate the functions, or fails to pick the better function after an objective evaluation. For example, an input can be false when a user selects the function the user believes is worse, or when the user selects a scoring function without considering the merits of the scoring function (e.g., when the user selects a scoring function at random, or always selects the scoring function whose results are presented in a certain place in the user interface). The system can detect that a given input is suspicious in various ways. In some implementations, the system detects that a given input is suspicious by examining a history of inputs from the user who submitted the input. The system can examine the history to identify patterns in the inputs. For example, if the user selects the scoring function whose order is displayed on one side of the user interface a large percentage of the time, and only rarely selects the scoring function on the other side of the user interface, the system can determine that the input is suspicious. The system can also examine the history to determine how the user rated scoring functions that are believed to be superior to other scoring functions. If the user does not select the superior scoring function enough (e.g., a statistically significant amount of the time), all inputs from the user (or a subset of the inputs) can be determined to be suspicious. The system can also examine the history to determine how closely the selections made by the user match selections made by other users comparing the same scoring functions. For example, if the user selected scoring function A over scoring function B, selected scoring function C over scoring function D, and selected scoring function E over scoring function F, but a threshold percentage of users comparing scoring function A with scoring function B selected scoring function B, and a threshold percentage of users comparing scoring function C with scoring function D, then the input selecting scoring function E over scoring function F can be deemed to be suspicious. The threshold can be determined based on a number of factors. In some implementations, the threshold is chosen to reflect the total number of evaluations for the pair of scoring functions being compared (e.g., the threshold can be higher to reflect the fact that the percentage is over a smaller population of users), and the fact that the comparisons may have involved different queries with different search results (e.g., the threshold can be higher to protect against cases where the input is not false, but rather, a reflection of the fact that different scoring functions are better for different types of queries).

The system can give suspicious inputs less weight, for example, by treating them as a fraction of a selection rather than a full selection when the system generates an order for the scoring functions. In some implementations, the fraction is based on a measure of suspicion for the input, where inputs that are more suspicious are treated as a smaller fraction of a selection. In some implementations, suspicious inputs also add less value to a team's karma (for example, by being treated as a fraction of an input rather than as a full input).

In some implementations, after an order for the scoring functions is generated, a notification is received that a candidate scoring function has been modified. A candidate scoring function can be modified, for example, when a new candidate scoring function is uploaded to replace the candidate scoring function. When a candidate scoring function is modified, the candidate scoring functions can be re-ranked using the stored pair-wise comparisons. In some implementations, all pair-wise comparisons involving the candidate scoring function are ignored for ranking purposes. In alternative implementations, each pair-wise comparison for the candidate scoring function is examined, and the search results corresponding to each pair-wise comparison are ranked according to scores from the modified candidate scoring function. If the ranking according to the scores for the search results from the modified candidate scoring function is the same as the ranking according to the scores for the search results from the original candidate scoring function, then the pair-wise comparison is used in the re-ranking. If the rankings are different, the candidate scoring function is not used in the re-ranking.

While the description of FIG. 6 refers to pairs of scoring functions and pair-wise comparisons, other implementations are possible, for example, selecting more than two scoring functions for evaluation at a time and having a user select one function over the other functions, or rank the functions in a preferred order.

Figure 7:
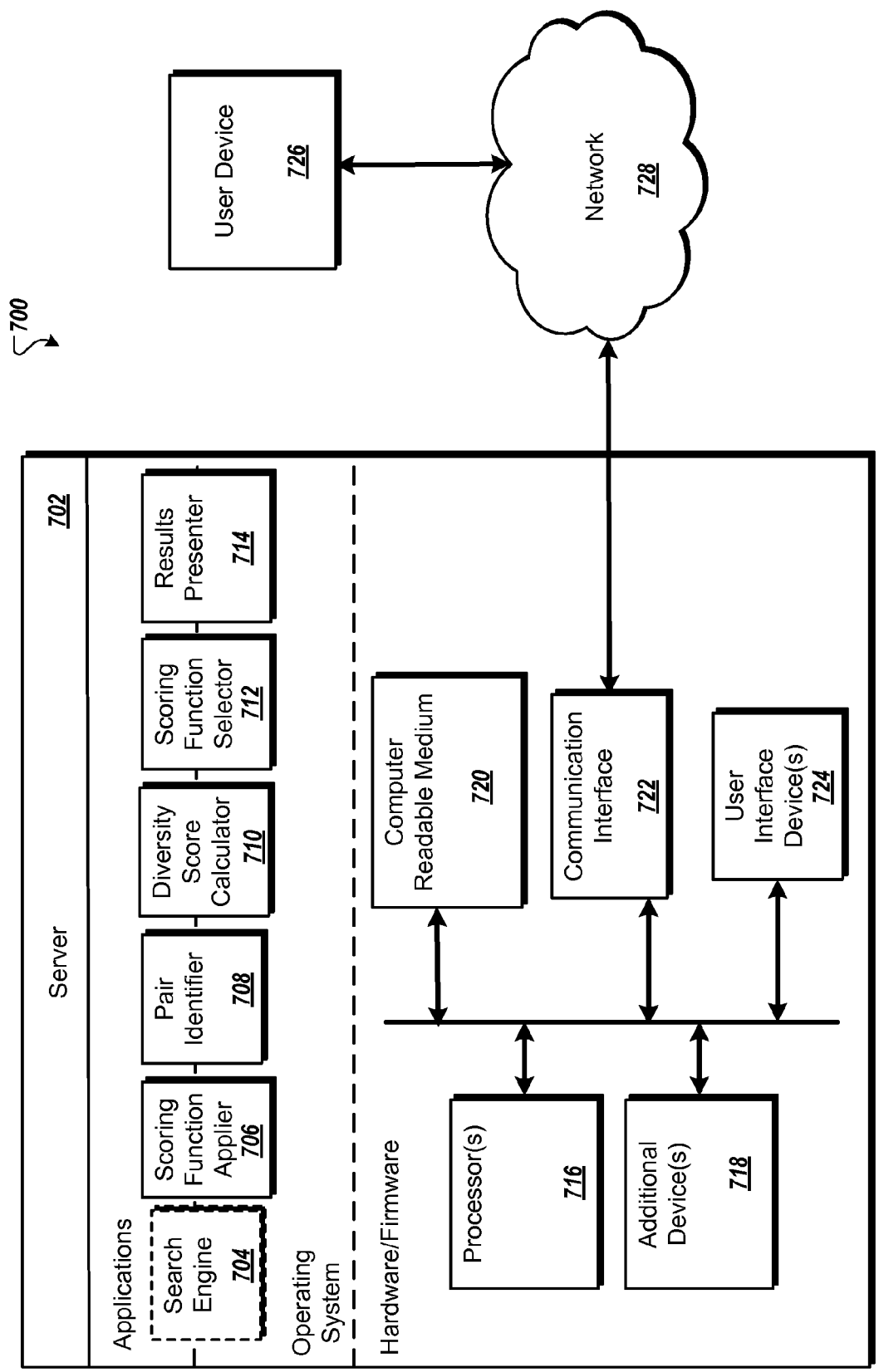
FIG. 7 illustrates an example architecture of a system.

FIG. 7 illustrates an example architecture of a system 700. The system generally consists of a server 702 and a user device 726. The server and the user device are connected through a network 728, e.g., the Internet.

While only one user device 726 is shown in FIG. 7, multiple user devices can be connected to the server 702 through the network 724.

The server 702 is a data processing apparatus. While only one data processing apparatus is shown in FIG. 7, the server may consist of multiple data processing apparatus.

The server 702 includes various modules, e.g. executable software programs, including an optional search engine 704, a scoring function applier 706, a pair identifier 708, a diversity score calculator 710, a scoring function selector 712, and a results presenter 714.

The search engine 704 generates search results responsive to a query, for example, as described above in reference to FIG. 2. In some implementations, the server 702 does not include a search engine, but instead receives search results responsive to the query from another device, for example, through the network 728.

The scoring function applier 706 applies candidate scoring functions to search results, for example, as described above in reference to FIGS. 4 and 6.

The pair identifier identifies pairs of candidate scoring functions for which to calculate a diversity score, for example, as described above in reference to FIG. 6.

The diversity score calculator 710 calculates a diversity score for each pair of candidate scoring functions, for example, as described above in reference to FIGS. 4 and 6.

The scoring function selector 712 selects a first and second scoring function, for example, as described above in reference to FIG. 6.

The results presenter 714 presents search results, for example, as described above in reference to FIGS. 1 and 6.

The server 702 can also have hardware or firmware devices including one or more processors 716, one or more additional devices 718, computer readable medium 720, and one or more user interface devices 724. Examples of user interface devices 724 include a display, a camera, a speaker, a microphone, a tactile feedback device, a keyboard, and a mouse.

In some implementations, the server 702 stores scoring functions, pair-wise comparison data, and other data. In some implementations, some or all of this data is stored on a computer readable medium 720. In some implementations, some or all of this data is stored on one or more additional devices 718, for example, a hard drive.

The server 702 uses its communication interface 722 to communicate with the first user device 726 and optionally other devices through the network 728. For example, the server 702 can receive scoring functions, queries, and input selecting one scoring function over another through its communication interface 722, and can provide search results through its communication interface 722.

A first user device 726 is connected to the server 702 through the network 728. The first user device 726 is one or more data processing apparatus. A user can use the first user device 726 to submit scoring functions to the server 602, for example, through a web-browser run on the first user device 726, for example, Firefox™, available from the Mozilla Project in Mountain View, Calif. The user can also use the first user device 726 to submit queries to the server 702, view search results corresponding to the query, and submit input to the server selecting one scoring function over another, for example, through a web-browser.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a query at a computer;
selecting a first candidate scoring function and a second candidate scoring function from a group of at least three candidate scoring functions;
presenting search results, which are responsive to the query, ordered according to scores from the first candidate scoring function;
presenting the search results, which are responsive to the query, ordered according to scores from the second candidate scoring function;
receiving user input selecting one of the first and second candidate scoring functions over the other; and
using the user input to inform future selections of pairs of candidate scoring functions from the group of candidate scoring functions.

2. The method of claim 1, further comprising:
classifying the query; and
using the classification to select the group of candidate scoring functions from a plurality of available scoring functions.

3. The method of claim 1, further comprising selecting the group of candidate scoring functions from a plurality of available scoring functions based on a respective score associated with each scoring function.

4. The method of claim 1, wherein using the user input to inform future selections of pairs of candidate scoring functions from the group of candidate scoring functions comprises:
generating a ranking for the candidate scoring functions in the group based at least in part on the user input; and
selecting, for evaluation by one or more other users, one or more candidate scoring functions in the group based at least in part on the ranking for the candidate scoring functions in the group.

5. The method of claim 4, comprising:
applying each respective candidate scoring function of the group to the search results to determine respective scores for the search results for the respective candidate scoring function; and
comparing results located in same positions in respective sets of the search results, ordered according to respective candidate scoring functions, for each of the pairs of candidate scoring functions;
wherein the selecting is based on output of the comparing.

6. The method of claim 5, wherein the comparing comprises comparing results in first through tenth positions in the respective sets of the search results.

7. The method of claim 5, wherein the applying comprises providing signals including information about the query and each result in the search results to each respective candidate scoring function.

8. The method of claim 4, wherein generating a ranking for the candidate scoring functions in the group based at least in part on the user input comprises:
identifying a user and an associated candidate scoring function from the group of candidate scoring functions, the user having provided the user input, and the user being associated with the associated candidate scoring function; and determining a number of inputs received from different users, including the identified user, associated with the associated candidate scoring function; and generating the ranking for the candidate scoring functions in the group based at least in part on the number of inputs received from the different users.

9. The method of claim 4, wherein generating a ranking for the candidate scoring functions in the group based at least in part on the user input comprises:

adding the user input to a set of multiple pair-wise user comparisons of scoring functions; and generating the ranking for the candidate scoring functions in the group based at least in part on the set of multiple pair-wise user comparisons.

10. The method of claim 9, wherein the search results ordered according to scores from the first candidate scoring function constitute a first order, and the method comprises:

receiving a notification that the first candidate scoring function has been modified;

applying the modified first scoring function to the search results to determine modified scores for the search results and to generate a second order for the search results according to the modified scores;

determining that the first order and the second order are different; and modifying the ranking for the candidate scoring functions in the group so that the modified ranking for the candidate scoring functions in the group does not reflect the user input.

11. The method of claim 4, further comprising:

receiving a second query;

selecting a third candidate scoring function and a fourth candidate scoring function from a top number of scoring functions in the ranking for the candidate scoring functions in the group;

presenting search results, which are responsive to the second query, ordered according to scores from the third candidate scoring function;

presenting the search results, which are responsive to the second query, ordered according to scores from the fourth candidate scoring function;

receiving second user input selecting one of the third and fourth candidate scoring functions over the other; and updating the ranking for the candidate scoring functions in the group based at least in part on the second user input.

12. A system comprising:

one or more processors; and one or more memory devices configured to cause the one or more processors to perform operations comprising:

receiving a query;

selecting a first candidate scoring function and a second candidate scoring function from a group of at least three candidate scoring functions;

presenting search results, which are responsive to the query, ordered according to scores from the first candidate scoring function;

presenting the search results, which are responsive to the query, ordered according to scores from the second candidate scoring function;

receiving user input selecting one of the first and second candidate scoring functions over the other; and using the user input to inform future selections of pairs of candidate scoring functions from the group of candidate scoring functions.

13. The system of claim 12, wherein the operations comprise:

classifying the query; and using the classification to select the group of candidate scoring functions from a plurality of available scoring functions.

14. The system of claim 12, wherein the operations comprise selecting the group of candidate scoring functions from a plurality of available scoring functions based on a respective score associated with each scoring function.

15. The system of claim 12, wherein using the user input to inform future selections of pairs of candidate scoring functions from the group of candidate scoring functions comprises:

generating a ranking for the candidate scoring functions in the group based at least in part on the user input; and selecting, for evaluation by one or more other users, one or more candidate scoring functions in the group based at least in part on the ranking for the candidate scoring functions in the group.

16. The system of claim 15, wherein the operations comprise:

receiving a second query;

selecting a third candidate scoring function and a fourth candidate scoring function from a top number of scoring functions in the ranking for the candidate scoring functions in the group;

presenting search results, which are responsive to the second query, ordered according to scores from the third candidate scoring function;

presenting the search results, which are responsive to the second query, ordered according to scores from the fourth candidate scoring function;

receiving second user input selecting one of the third and fourth candidate scoring functions over the other; and updating the ranking for the candidate scoring functions in the group based at least in part on the second user input.

17. The system of claim 16, wherein the operations comprise:

applying each respective candidate scoring function of the group to the search results to determine respective scores for the search results for the respective candidate scoring function; and comparing results located in same positions in respective sets of the search results, ordered according to respective candidate scoring functions, for each of the pairs of candidate scoring functions;

wherein the selecting is based on output of the comparing.

18. The system of claim 17, wherein the comparing comprises comparing results in first through tenth positions in the respective sets of the search results.

19. The system of claim 17, wherein the applying comprises providing signals including information about the query and each result in the search results to each respective candidate scoring function.

20. The system of claim 16, wherein generating a ranking for the candidate scoring functions in the group based at least in part on the user input comprises:

identifying a user and an associated candidate scoring function from the group of candidate scoring functions, the user having provided the user input, and the user being associated with the associated candidate scoring function; and determining a number of inputs received from different users, including the identified user, associated with the associated candidate scoring function; and generating the ranking for the candidate scoring functions in the group based at least in part on the number of inputs received from the different users.

21. The system of claim 16, wherein generating a ranking for the candidate scoring functions in the group based at least in part on the user input comprises:
adding the user input to a set of multiple pair-wise user comparisons of scoring functions; and
generating the ranking for the candidate scoring functions in the group based at least in part on the set of multiple pair-wise user comparisons.

22. The system of claim 21, wherein the search results ordered according to scores from the first candidate scoring function constitute a first order, and the operations comprise:
receiving a notification that the first candidate scoring function has been modified;
applying the modified first scoring function to the search results to determine modified scores for the search results and to generate a second order for the search results according to the modified scores;
determining that the first order and the second order are different; and
modifying the ranking for the candidate scoring functions in the group so that the modified ranking for the candidate scoring functions in the group does not reflect the user input.

23. A system comprising:
one or more computers and one or more storage devices storing instructions that are operable, when executed by the one or more computers, to cause the one or more computers to perform actions comprising:
receiving a plurality of queries sequentially, each query being received from a respective user; and
performing the following operations with respect to each query and respective user:
selecting a pair of candidate scoring functions from a group of at least three candidate scoring functions, the pair including a first candidate scoring function and a second candidate scoring function, the selecting being based at least in part on a ranking of the candidate scoring functions in the group;
presenting search results, which are responsive to the query, ordered according to scores from the first candidate scoring function, to the respective user;
presenting the search results, which are responsive to the query, ordered according to scores from the second candidate scoring function, to the respective user;
receiving user input, from the respective user, selecting one of the first and second candidate scoring functions over the other; and
using the user input to update the ranking of the candidate scoring functions in the group.

24. The system of claim 23, wherein using the user input to update the ranking of the candidate scoring functions in the group comprises:
adding the user input to a set of multiple pair-wise user comparisons of scoring functions; and
generating the ranking of the candidate scoring functions in the group based at least in part on the set of multiple pair-wise user comparisons.

25. The system of claim 23, wherein selecting a pair of candidate scoring functions from a group of at least three candidate scoring functions comprises:
determining a diversity score between the first candidate scoring function and the second candidate scoring function, wherein the diversity score is based at least in part on a comparison of respective search result sets ordered according to the first candidate scoring function and the second candidate scoring function; and
determining that the diversity score between the first scoring function and the second scoring function satisfies a threshold.

* * * * *